US008880282B2

(12) United States Patent
Gunaratne

(10) Patent No.: US 8,880,282 B2
(45) Date of Patent: Nov. 4, 2014

(54) METHOD AND SYSTEM FOR RISK PREDICTION FOR A SUPPORT ACTUATION SYSTEM

(75) Inventor: Pujitha Gunaratne, Windsor (CA)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 633 days.

(21) Appl. No.: 12/897,596

(22) Filed: Oct. 4, 2010

(65) Prior Publication Data
US 2012/0083942 A1    Apr. 5, 2012

(51) Int. Cl.
  *B60W 40/09*    (2012.01)
  *B60W 40/02*    (2006.01)
  *B60W 50/00*    (2006.01)

(52) U.S. Cl.
  CPC .......... *B60W 40/09* (2013.01); *B60W 2550/12* (2013.01); *B60W 40/02* (2013.01); *B60W 2540/30* (2013.01); *B60W 2050/0051* (2013.01); *B60W 2050/005* (2013.01); *B60W 2050/0029* (2013.01)
  USPC .......... 701/33.4; 180/272; 340/439; 340/575; 340/576; 701/29.1

(58) Field of Classification Search
  CPC ................ B60W 40/02; B60W 40/09; B60W 2050/0029; B60W 2550/12; B60W 2050/0051; B60W 2540/30; B60W 2050/005
  USPC .......... 340/436, 438, 575, 576, 439; 382/115, 382/118; 701/33.4, 45, 48, 29.1; 705/4; 180/272, 287
  See application file for complete search history.

(56) References Cited

U.S. PATENT DOCUMENTS

| 5,465,079 | A | * | 11/1995 | Bouchard et al. ............. 340/576 |
| 5,795,306 | A |   | 8/1998  | Shimotani et al. |
| 5,859,921 | A |   | 1/1999  | Suzuki |
| 6,049,747 | A |   | 4/2000  | Nakajima et al. |
| 6,496,117 | B2 |  | 12/2002 | Gutta et al. |
| 6,718,235 | B1 | * | 4/2004 | Borugian .......................... 701/1 |
| 6,724,920 | B1 |  | 4/2004  | Berenz et al. |
| 6,847,873 | B1 |  | 1/2005  | Li |

(Continued)

FOREIGN PATENT DOCUMENTS

JP    8083344    3/1996

OTHER PUBLICATIONS

Kim, Kyungnam, "Face Recognition using Principle Component Analysis", Dept. of Computer Science, University of Maryland, 7 pages.

*Primary Examiner* — Stephen Holwerda
(74) *Attorney, Agent, or Firm* — Snell & Wilmer LLP

(57) ABSTRACT

A method and system for risk prediction for a support actuation system. The system includes a support actuation system for an automobile having a support actuation module and/or a risk prediction system. The risk prediction system includes a sensor, a processor, and/or a memory. The sensor detects images corresponding to identity data, environment data, event data, and/or behavior data, which are stored in the memory. The memory also stores a database including identities of users, environment risk values, event risk values, and/or behavior risk values. Using the identity data, the environment data, the event data, and/or the behavior data, the processor determines the environment risk value, the event risk value, the behavior risk value, and/or the total risk value for a user. When the total risk value is above a predetermined risk threshold, the support actuation module performs support actuation.

20 Claims, 16 Drawing Sheets

(56) References Cited

U.S. PATENT DOCUMENTS

| | | |
|---|---|---|
| 6,925,425 B2 | 8/2005 | Remboski |
| 6,927,694 B1 | 8/2005 | Smith et al. |
| 6,974,414 B2 | 12/2005 | Victor |
| 6,982,635 B2 | 1/2006 | Obradovich |
| 7,027,621 B1* | 4/2006 | Prokoski .................. 382/118 |
| 7,071,831 B2 | 7/2006 | Johns |
| 7,149,653 B2 | 12/2006 | Bihler et al. |
| 7,292,152 B2 | 11/2007 | Torkkola et al. |
| 7,336,804 B2 | 2/2008 | Steffin |
| 7,389,178 B2 | 6/2008 | Raz et al. |
| 7,391,305 B2 | 6/2008 | Knoll et al. |
| 7,423,540 B2 | 9/2008 | Kisacanin |
| 7,482,911 B2 | 1/2009 | Lengning et al. |
| 7,561,054 B2 | 7/2009 | Raz et al. |
| 2002/0091473 A1* | 7/2002 | Gardner et al. ............... 701/35 |
| 2002/0116156 A1* | 8/2002 | Remboski et al. ............ 702/188 |
| 2003/0043045 A1* | 3/2003 | Yasushi et al. ............... 340/576 |
| 2003/0154009 A1* | 8/2003 | Basir et al. ..................... 701/35 |
| 2003/0181822 A1* | 9/2003 | Victor ............................ 600/558 |
| 2003/0187704 A1* | 10/2003 | Hashiguchi et al. .............. 705/4 |
| 2004/0071318 A1 | 4/2004 | Cheung et al. |
| 2005/0024212 A1 | 2/2005 | Hultzsch |
| 2005/0030184 A1 | 2/2005 | Victor |
| 2005/0131597 A1* | 6/2005 | Raz et al. ....................... 701/29 |
| 2006/0072792 A1 | 4/2006 | Toda et al. |
| 2006/0095175 A1 | 5/2006 | deWaal et al. |
| 2007/0158128 A1* | 7/2007 | Gratz et al. .................. 180/287 |
| 2007/0165910 A1 | 7/2007 | Nagaoka et al. |
| 2007/0219675 A1* | 9/2007 | Uchida et al. ..................... 701/1 |
| 2008/0069403 A1 | 3/2008 | Breed |
| 2008/0303915 A1 | 12/2008 | Omi |

* cited by examiner

Environment Image

Silhouette Image

Semantic Representation

Frustration

Texting

Joy

Eating/ Drinking/ Smoking

Grabbing Objects

Anger

| Behavior Risk Database (From Crash Data) ||
|---|---|
| Actions | Increase In Driver's Risk of a Crash/Near-Crash |
| Cell Phone Texting | By 23 Times |
| Reaching for Objects While Moving | By 9 Times |
| Eating, Drinking | By 3 Times |
| Dialing a Hand Held Device | By 3 Times |
| Talking on a Hand Held Device | By 1.3 Times |

Fig. 12

METHOD AND SYSTEM FOR RISK PREDICTION FOR A SUPPORT ACTUATION SYSTEM

BACKGROUND

1. Field

The present invention relates to a method and system for risk prediction for a support actuation system.

2. Description of the Related Art

In a conventional automobile, a driver may be prone to accidents due to the actions of the user, the environment surrounding the automobile, and/or the events occurring in the environment. Devices have been developed to warn the user of an impending accident. However, such devices do not base their warnings on the identity of the user. In addition, such devices base their calculations for warnings on the current actions of the user and do not incorporate the historical actions of the user. Thus, such devices are unable to accurately perform risk prediction. This can reduce the effectiveness of the device in accident avoidance.

Thus, there is a need for a method and system for risk prediction for a support actuation system.

SUMMARY

The present invention relates to a method and system for risk prediction for a support actuation system. In one embodiment, the present invention is an automobile including a support actuation system. The support actuation system can include, for example, a support actuation module and/or a risk prediction system. The support actuation module can provide support actuation when a total risk value generated by the risk prediction system is greater than a predetermined threshold. The risk prediction system can include, for example, a sensor, a processor, and/or a memory.

The risk prediction system generates a total risk value and controls the support actuation module to provide support actuation when the total risk value is greater than a predetermined risk threshold. The sensor can detect images, which can correspond to identity data, environment data, event data, and/or behavior data. The memory can store the identity data, the environment data, the event data, the behavior data, and/or database data. The database data can include, for example, identities of users, environment risk values, event risk values, and/or behavior risk values. The environment risk values, the event risk values, and/or the behavior risk can be based on historical actions of the user. Using the identity data, the environment data, the event data, and/or the behavior data, the processor can determine the environment risk value, the event risk value, and/or the behavior risk value for a user of the automobile.

The processor can use the environment risk value, the event risk value, and/or the behavior risk value to determine a total risk value for the user. When the total risk value is above a predetermined risk threshold, the processor can instruct the support actuation module to perform support actuation. Since the environment risk value, the event risk value, and/or the behavior risk value can be based on historical actions of the user, a more accurate risk assessment can be performed.

In one embodiment, the present invention is a method for risk prediction for a support actuation system including detecting, using a sensor, identity data of a user of an automobile, detecting, using the sensor, behavior data of the user, detecting, using the sensor, environment data, detecting, using the sensor, event data, and generating, using a processor, a total risk value based on the identity data, the behavior data, the environment data, and the event data.

In another embodiment, the present invention is a method for risk prediction for a support actuation system in an automobile including detecting, using a sensor, identity data of a user of the automobile, detecting, using the sensor, behavior data of the user, detecting, using the sensor, environment data, detecting, using the sensor, event data, generating, using a processor, an environment risk value of the environment data, generating, using the processor, an event risk value of the event data, generating, using the processor, a total risk value based on the identity data, the behavior data, the environment risk value, and the event risk value, and performing, using a support actuation module, support actuation when the total risk value is greater than a predetermined risk threshold.

In yet another embodiment, the present invention is an automobile including a sensor detecting identity data of a user in the automobile, a behavior data of the users in the automobile, environment data, and event data, a memory storing a database, the identity data, the behavior data, the environment data, and the event data, a processor connected to the sensor and the memory, and configured to analyze the identity data, using the processor, to locate a first user in the database with an identity corresponding to the identity data, generate an environment risk value of the environment data using the database, generate an event risk value, and to generate a total risk value based on the identity data, the behavior data, the environment risk value, and the event risk value, and a support actuation module connected to the processor and configured to perform support actuation when the total risk value is greater than a predetermined risk threshold.

BRIEF DESCRIPTION OF THE DRAWINGS

The features, obstacles, and advantages of the present invention will become more apparent from the detailed description set forth below when taken in conjunction with the drawings, wherein:

FIG. 12 depicts a behavior risk database according to an embodiment of the present invention;

DETAILED DESCRIPTION

Apparatus, systems and methods that implement the embodiments of the various features of the present invention will now be described with reference to the drawings. The drawings and the associated descriptions are provided to illustrate some embodiments of the present invention and not to limit the scope of the present invention. Throughout the drawings, reference numbers are re-used to indicate correspondence between referenced elements.

Figure 1:
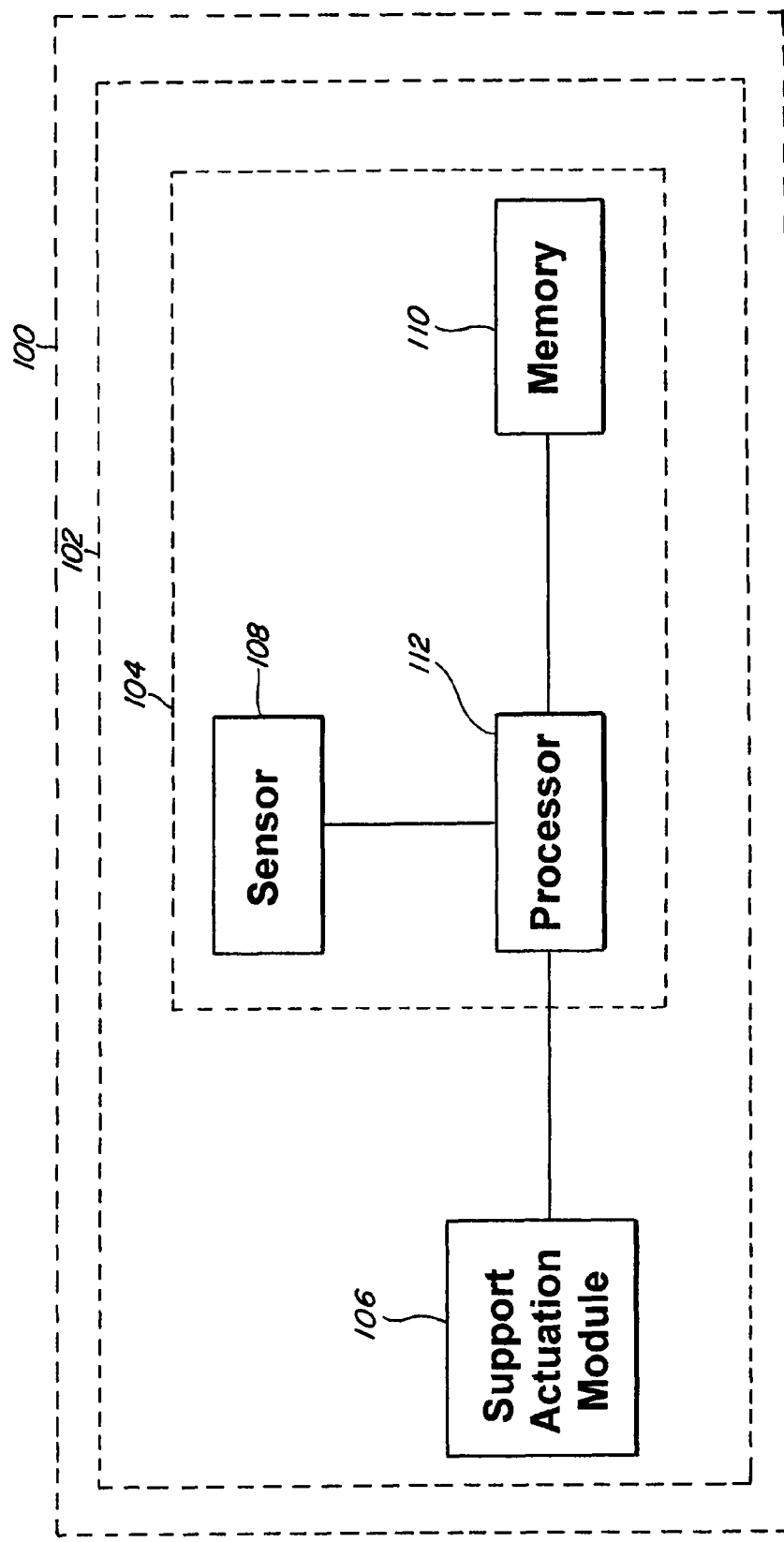
FIG. 1 depicts a box diagram of an automobile including a risk prediction system and a support actuation module according to an embodiment of the present invention.

In one embodiment, the present invention includes an automobile 100 as shown in FIG. 1. The automobile 100 can include a support actuation system 102 including a risk prediction system 104 coupled with a support actuation module 106.

The support actuation module 106 can be, for example, an audio system, a visual system, a driver assist system, and/or any combinations thereof. Thus, in providing support actuation, the support actuation module 106 can generate an audio signal, a visual signal, a haptic signal, assist the driver in a variety of manners, and/or any combinations thereof. The support actuation module 106 can provide support actuation when, for example, the risk prediction system 104 indicates that a total risk value is greater than a risk threshold.

The risk prediction system 104 generates a total risk value and controls the support actuation module 106 to provide support actuation when the total risk value is greater than a predetermined risk threshold. The risk prediction system 104 can include, for example, a sensor 108, a memory 110, and/or a processor 112.

Figure 3:
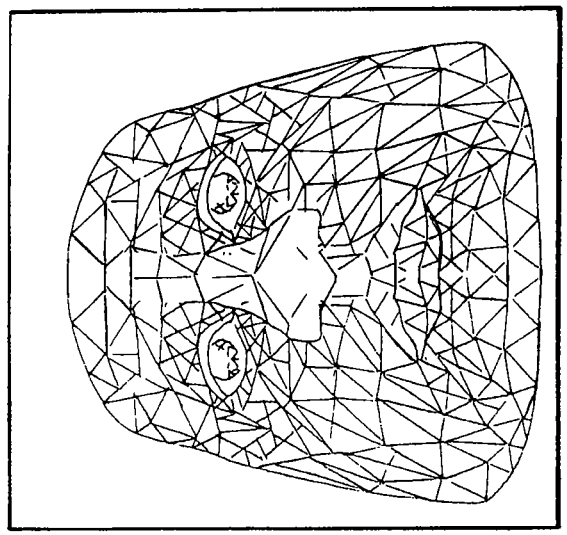
FIG. 3 depicts identity data according to an embodiment of the present invention.
Figure 2:
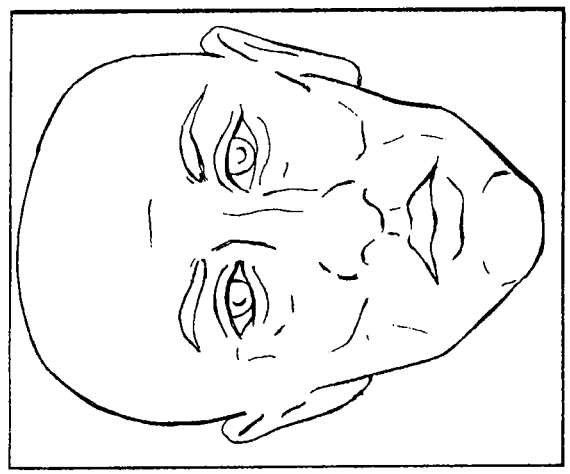
FIG. 2 depicts identity data according to an embodiment of the present invention.
Figure 5:
FIG. 5 depicts identity data according to an embodiment of the present invention.
Figure 4:
FIG. 4 depicts identity data according to an embodiment of the present invention.
Figure 6:
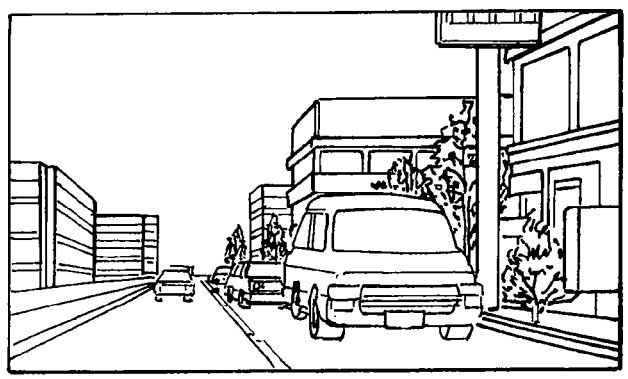
FIG. 6 depicts environment data according to an embodiment of the present invention.
Figure 7:
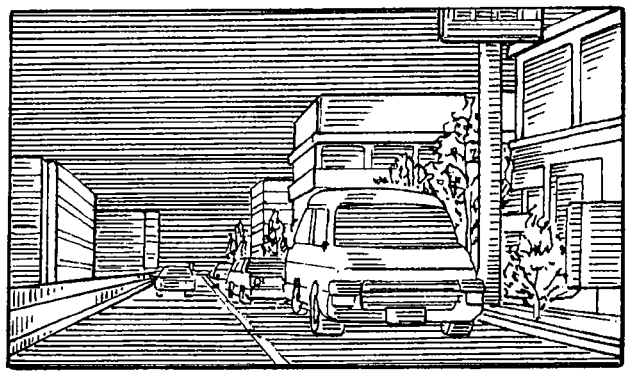
FIG. 7 depicts environment data according to an embodiment of the present invention.
Figure 8:
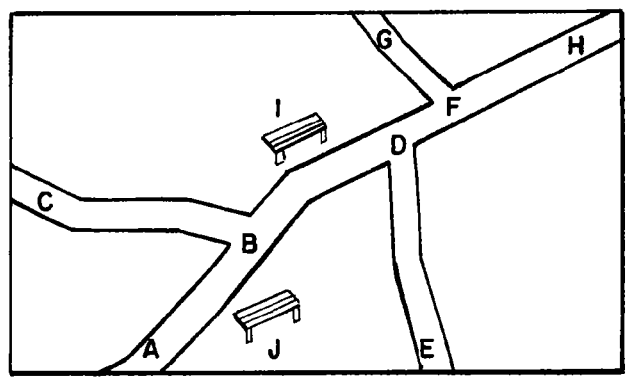
FIG. 8 depicts environment data according to an embodiment of the present invention.

The sensor 108 can be coupled with, for example, the memory 110, and/or the processor 112. The sensor 108 can be, for example, a camera with charge-coupled device (CCD) sensor arrays that can capture images such as color images, infrared images, laser images or a combination of the above. The sensor 108 can capture images containing a head and upper part of a body of the user, and/or an environment around the automobile 100. Other portions of the body of the user can also be captured in the images. The head of the user can be seen, for example, in FIG. 2 and FIG. 3. As seen in FIG. 2, the contour of the head can be captured, while in FIG. 3, a 3-Dimensional ("3-D") face model can be captured. In addition, as seen in FIG. 4 and FIG. 5, a 3-D body model of the body of the user can also be captured. The sensor 108 can also capture images of the environment as seen in FIG. 6. From the images of the environment, silhouettes of the environment can also be extracted as seen in FIG. 7. In FIG. 8, the images of the environment can also be processed to form a semantic representation.

The sensor 108 can parse the images captured into useable data using, for example, Computer Vision algorithms. Thus, from the images, the sensor 108 can detect, for example, identity data, behavior data, environment data, and/or event data. The identity data can indicate, for example, an identity of a user of the automobile 100. The Computer Vision algorithms can be stored in the memory 110 and can be executed by the processor 112.

The identity data can be, for example, the images of the head and/or the body that were captured by the sensor 108, and shown in FIGS. 2-5. The behavior data can indicate, for example, a behavior of the user in the automobile 100. The behavior of the user can be identified using behavior definition parameters which can be compared with the behavior data. The behavior data can also be, for example, the images of the head and/or the body that was captured by the sensor 108.

The environment data can indicate, for example, an environment around the automobile 100. The environment data can be seen, for example, in FIGS. 6-8. The event data can indicate, for example, events occurring in the environment and can also be from the images shown in FIGS. 6-8.

The memory 110 can be coupled with, for example, the processor 112. The memory 110 can store identity data, behavior data, environment data, and/or event data detected by the sensor 108. In addition, the memory 110 can also store one or more databases containing identities of users, and behaviors which correspond to the behavior data associated with the users. The databases can also include behavior risk values associated with the behavior data, environment risk values associated with the environment data, and event risk values associated with the event data. Thus, the identity data, the behavior risk data, the environment data, and the event data can be used to generate the behavior risk value, the environment risk value, and/or the event risk value. In addition, the databases can include behavior definition parameters which can be compared to the behavior data to determine the behaviors of users.

The processor 112 can be coupled with, for example, the sensor 108, and/or the memory 110. The processor 112 can use the identity data, the behavior risk value, the environment risk value, and/or the event risk value to calculate a total risk value. The total risk value can indicate a risk that the user is facing due to the behavior detected by the sensor 108 for the environment surrounding the automobile 100 and the event occurring in the environment. The processor 112 can compare the total risk value to a predetermined risk threshold and determine whether to control the support actuation module 106 to perform support actuation or not perform support actuation.

Figure 9:
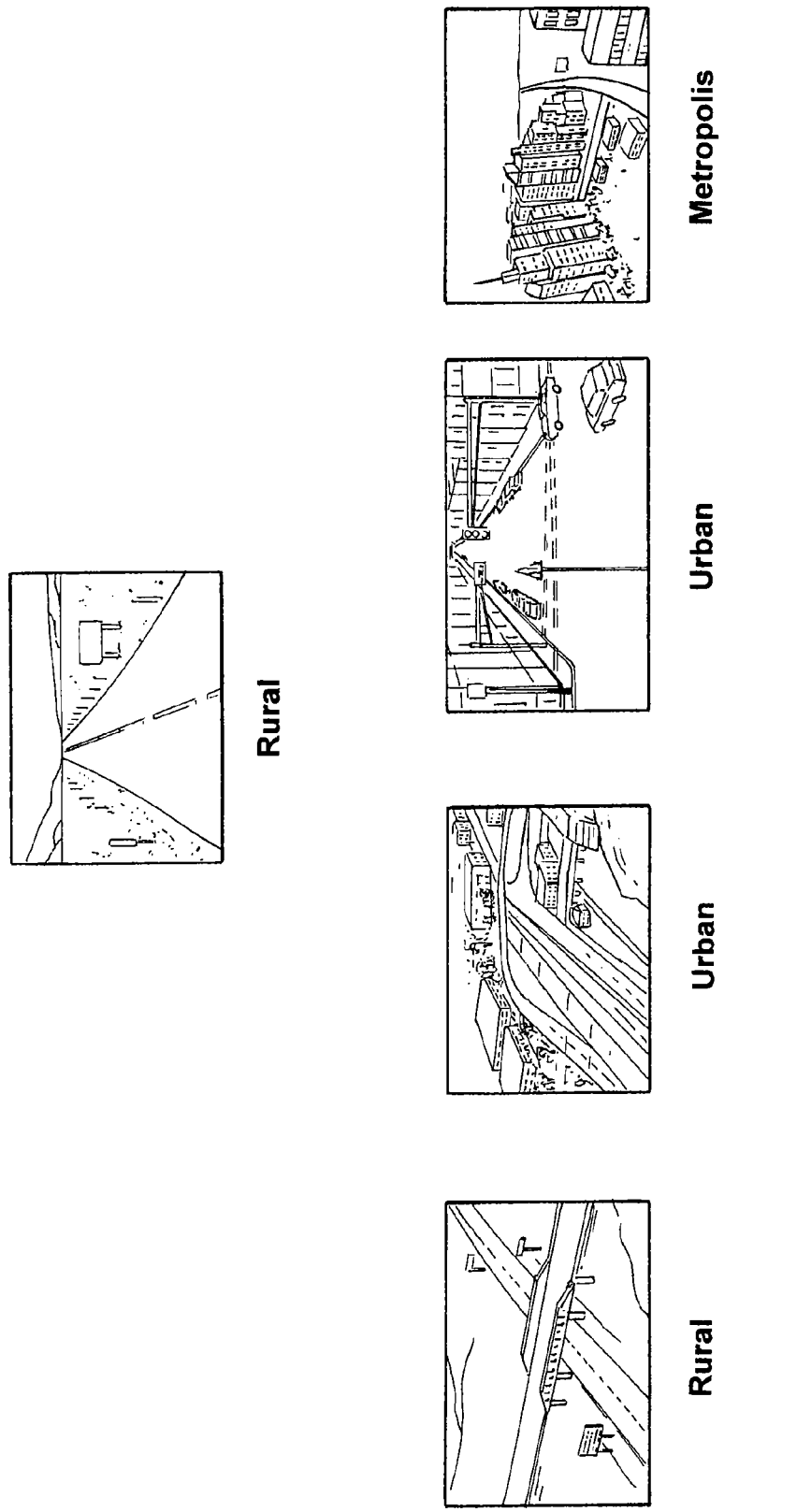
FIG. 9 depicts environment categories according to an embodiment of the present invention.

The processor 112 can calculate the total risk value using the equation $R = N \times V \times B$, where R is the total risk value, N is the environment risk value, V is the event risk value, and B is the behavior risk value. The environment risk value can be calculated using the formula $N = k \times \tau \times \epsilon$, where k is a constant for the environment risk value, $\tau$ is a non-zero positive value associated with an environment type, and $\epsilon$ is a non-zero positive value associated with a location of the environment. In FIG. 9, the environment types can include, for example, several types of rural, urban, and/or metropolis environments.

The environment types, however, are not necessarily limited to just those depicted in FIG. 9.

Figure 10:
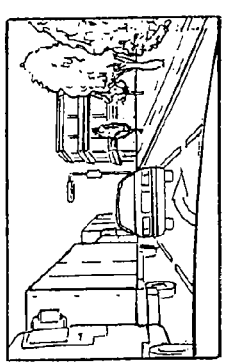
FIG. 10 depicts event categories according to an embodiment of the present invention.
Figure 10:
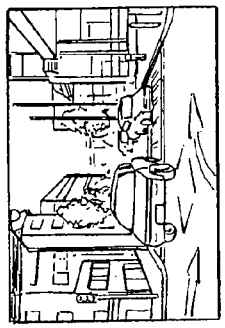
Figure 10:
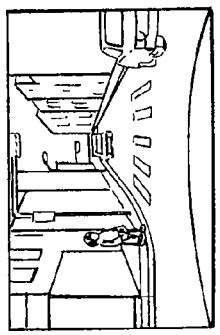
Figure 10:
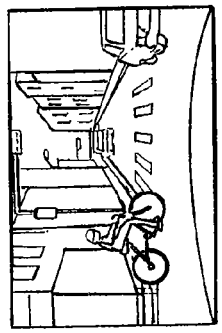

The event risk value can be calculated using the formula $V=k\times\lambda\times\upsilon$ where k is a constant for the event risk value, $\lambda$ is a non-zero positive value associated with an object type associated with the event, and $\upsilon$ is a non-zero positive value associated with a motion type. The event types can include, for example, events occurring in the environment and can be seen, for example, in FIG. 10. In FIG. 10, the event types can include, for example, cyclist crossing across, pedestrian trying to cross, oncoming traffic in an intersection, and/or being surrounded by large vehicles. The event types, however, are not necessarily limited to just those depicted in FIG. 10.

Figure 11:
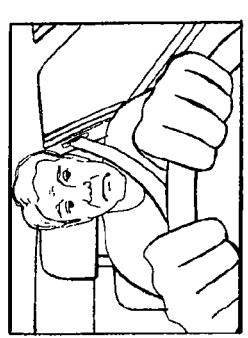
FIG. 11 depicts behavior categories according to an embodiment of the present invention.
Figure 11:
Figure 11:
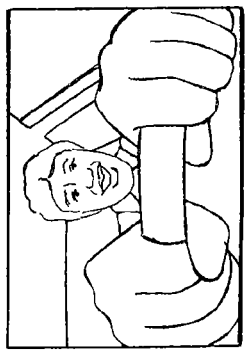
Figure 11:
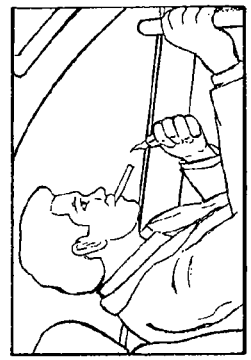
Figure 11:
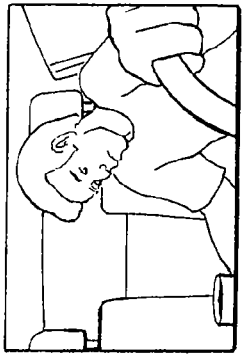
Figure 11:
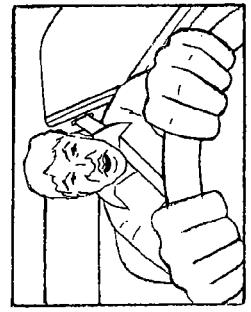

The behavior risk value can be calculated using the formula $B=k\times\beta$, where k is a constant for the behavior risk value, and $\beta$ is a non-zero positive value associated with behaviors. The behaviors can be, for example, behaviors of the user of the automobile, and can be seen, for example, in FIG. 11. In FIG. 11, the behaviors can include, for example, grabbing objects, being in a state of joy, being in a state of frustration, being in a state of anger, eating, drinking, smoking, and/or texting. The behavior types, however, are not necessarily limited to just those depicted in FIG. 11.

The behavior risk value can be stored, for example, in a behavior risk database based on crash data for each behavior type. For example, texting can have a behavior risk value of 23. Reaching for objects while moving can have a behavior risk value of 9. Eating and/or drinking can have a behavior risk value of 3. Dialing a hand held device can have a behavior risk value of 3. Talking on a hand held device can have a behavior risk value of 1.3. Such behavior risk values can be specific to an individual user, generalized to many users, and/or a combination of the above.

Figure 13:
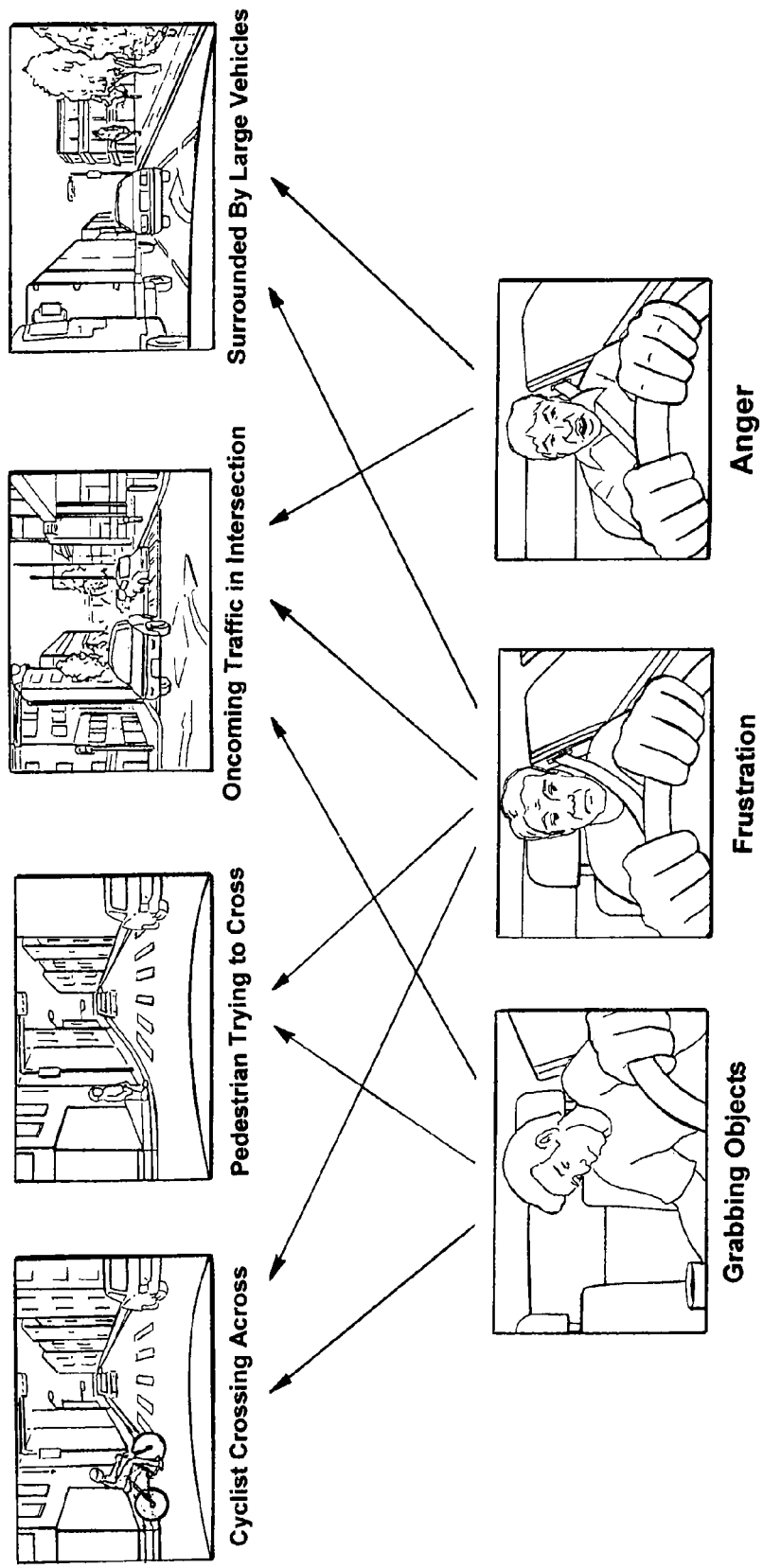
FIG. 13 is a visual depiction of a calculation of a scene severity risk value according to an embodiment of the present invention.

As noted above, the processor 112 can calculate the total risk value using the equation $R=N\times V\times B$, where R is the total risk value, N is the environment risk value, V is the event risk value, and B is the behavior risk value. An illustration of such a calculation for the multiplication of the behavior risk value and the event types can be seen in FIG. 13. For example, the behavior risk value for the user grabbing objects in the automobile can be multiplied by the event risk value for a cyclist crossing across, a pedestrian trying to cross, and/or oncoming traffic in an intersection depending on the event type detected by the sensor 108. The behavior risk value for the user being in a state of anger can be multiplied with the event risk value for a cyclist crossing across, a pedestrian trying to cross, oncoming traffic in intersection, and/or the automobile being surrounded by large vehicles depending on the event type detected by the sensor 108.

The result of the multiplication of the behavior risk value and the event risk value can be combined with the environment risk value to generate the total risk value.

In one embodiment, the total risk value R can also be calculated by substituting N and V for their representative values, $\lambda$, $\upsilon$, $\tau$, $\epsilon$, resulting in the equation $R=k\times(\lambda\times\upsilon\times\tau\times\epsilon)\times B$, where k is a constant for the total risk value. The total risk value can also be calculated as $R=k\times\eta\times\beta$ where R is the total risk value, k is a constant for the total risk value, $\eta$ is a scene severity risk value, and $\beta$ is the behavior risk value. The scene severity risk value therefore, can be calculated using the formula $\eta=N\times V$, where N is the environment risk value, and V is the event risk value. Thus, the scene severity risk value represents the combination of the environment risk value and the event risk value. This allows for the behavior risk value to be easily graphed. It is advantageous to graph the behavior risk value since such risk values vary from user to user.

Figure 14:
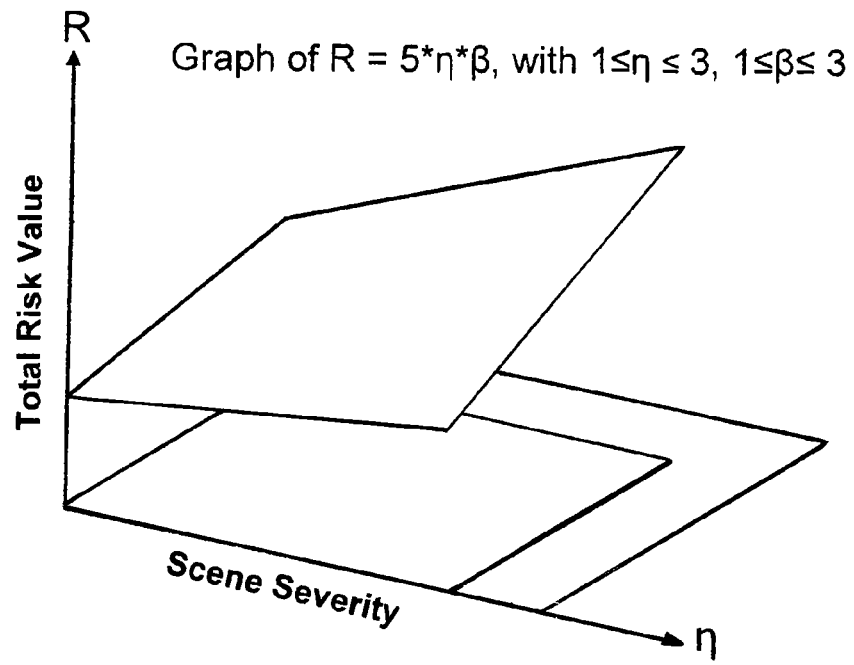
FIG. 14 depicts a graph of a total risk value according to an embodiment of the present invention.
Figure 15:
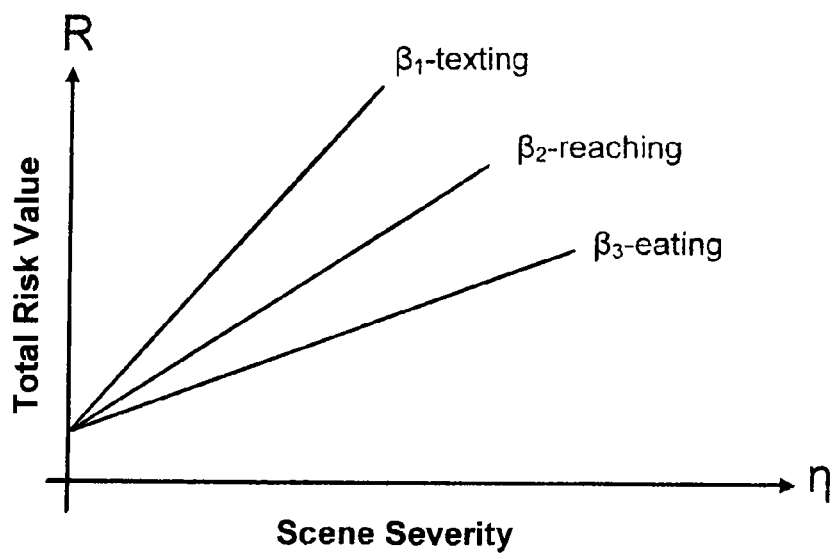
FIG. 15 depicts a graph of a total risk value according to an embodiment of the present invention.
Figure 16:
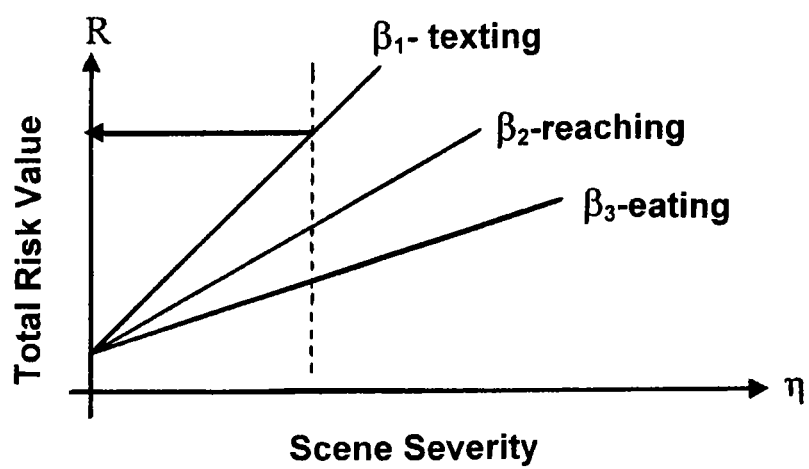
FIG. 16 depicts a graph of a total risk value according to an embodiment of the present invention.

A 3-D graph of the total risk value R over scene severity risk value $\eta$ can be seen in FIG. 14 where k is set to 5, $\eta$ has a value between 1 and 3, and $\beta$ has a value between 1 and 3. A two dimensional graph of the total risk value R over scene severity risk value $\eta$ can be seen in FIG. 15 for several behaviors. For example, the line $\beta_1$ can represent the total risk value when the user's behavior is texting. The line $\beta_2$ can represent the total risk value when the user's behavior is reaching for an object. The line $\beta_3$ can represent the total risk value when the user's behavior is reaching for an object. Thus, by knowing the scene severity value and the type of the user's behavior, the total risk value R for each of the user's activity can be known as seen in the graph in FIG. 16. In FIG. 16, as indicated by the dotted line, when the scene severity risk value $\eta$ is known, a total risk value R of the behavior texting for the user in the automobile 100 can be determined.

Based on the total risk value, the processor 112 can determine instructions to send to the support actuation module 106. For example, the processor 112 can control the support actuation module 106 to perform support actuation when the total risk value R is greater than a predetermined risk threshold.

Figure 17:
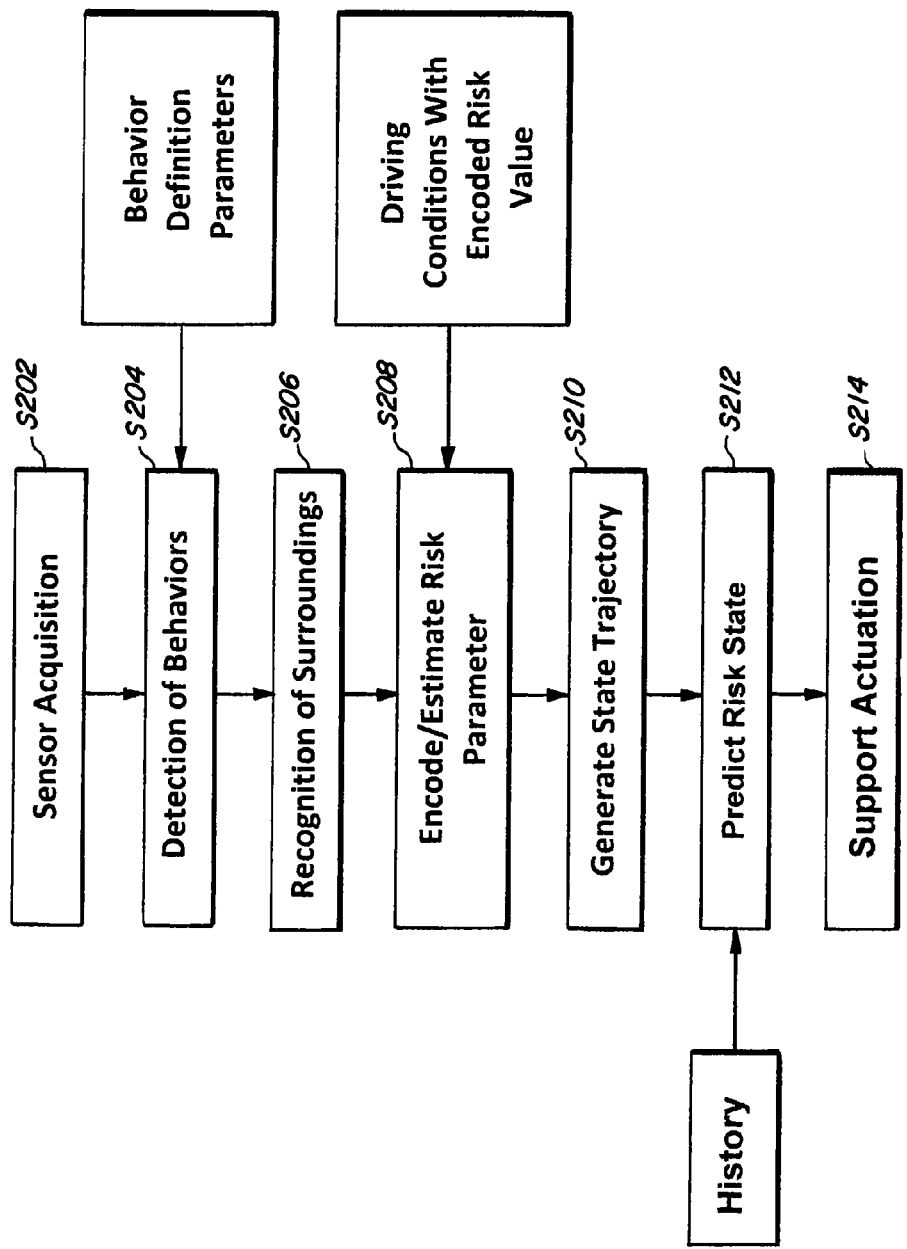
FIG. 17 depicts a flowchart according to an embodiment of the present invention.

Furthermore, operations of the support actuation system 102 can also be seen, for example, in the flowchart depicted in FIG. 17. In Step S202, a sensor can acquire data. For example, the sensor 108 can acquire identity data, behavior data, environment data, and/or event data. In Step S204, detection of behaviors is performed. For example, the processor 112 can analyze the behavior data and use behavior definition parameters to determine the behaviors of the user. In Step S206, the surroundings of the automobile can be recognized. For example, the processor 112 can analyze the environment data and the event data to determine the type of environment and the type of events that are occurring in the environment.

In Step S208, a risk parameter is encoded and/or estimated. For example, driving conditions with encoded risk values such as the identity data, the behavior data, the environment data, and/or the event data can be used by the processor 112 to determine the behavior risk value, and/or the scene severity risk value. In Step S210, a general state trajectory can be generated. The general state trajectory can be used, for example, to determine the behavior risk value associated with a behavior data when the user is unknown and/or the behavior of the user is unknown. Since the scene severity risk value $\eta$ is known, this allows the total risk value R to be calculated.

In Step S212, the risk state is predicted. For example, using historical information about the user, the behaviors exhibited by the user, and/or the scene severity risk value, the total risk value R is calculated. The historical information about the user and/or the behaviors exhibited by the user can correspond, for example, to the behavior risk value. In Step S214, support actuation is performed. For example, the processor 112 can control the support actuation module 106 to perform support actuation when the total risk value is greater than a predetermined risk threshold.

Figure 18:
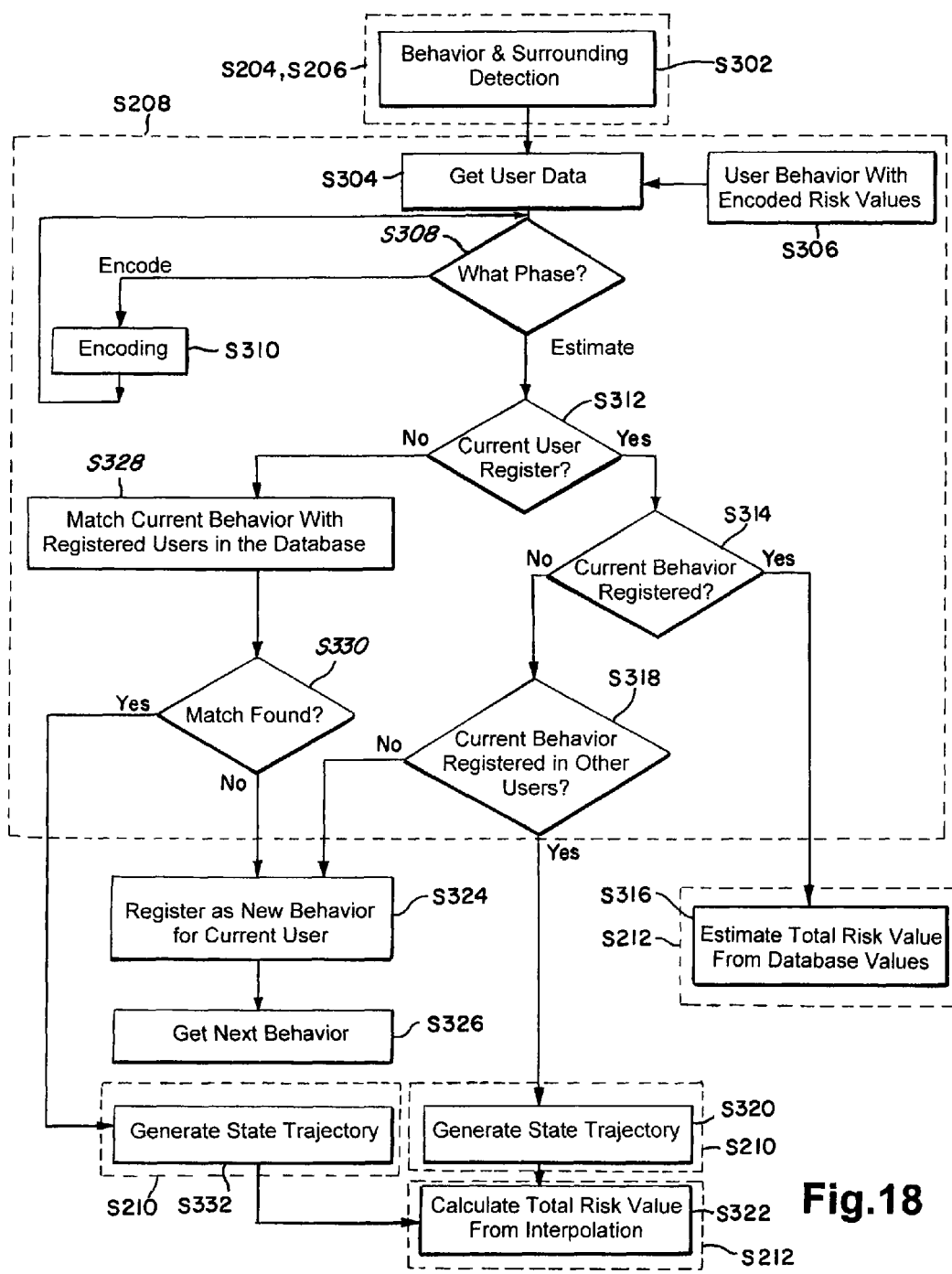
FIG. 18 depicts a flowchart according to an embodiment of the present invention.

Some of the steps in the flowchart depicted in FIG. 17 are explained in more detail in the flowchart in FIG. 18. As seen in FIG. 18, in Step S302, behavior and surrounding detection are performed. This is similar to Step S204 and S206 in FIG. 17. Step S304, S306, S308, S310, S312, S314, S318, S326, S328, and/or S330 are also part of Step S208 in FIG. 17. In Step S304 and Step S306 user data is retrieved including user behavior with encoded risk values.

In Step S308, a determination is made as to what phase it is. In Step S310, if the phase is an encoding phase, then data is encoded and the process optionally returns to Step S308. For example, data can be encoded when risk collection is being formed to collect data to determine the behavior risk values, the environment risk values, and/or the event risk values. In Step S312, if the phase is an estimation phase to determine the total risk value, a determination is made as to whether the current user is registered. If the user is registered, then in Step S314, a determination is made as to whether the current behavior is registered. If the current behavior is registered, then in Step S316, a total risk value is estimated from the database values. This is similar, for example, to Step S212 in the flowchart shown in FIG. 17. If the current behavior is not registered, then in Step S318, a determination is made as to whether the current behavior is registered in other users. If the current behavior is registered in other users, a state trajectory can be generated in Step S320. Step S320 is similar, for example, to Step S210 in the flowchart shown in FIG. 17.

Figure 19:
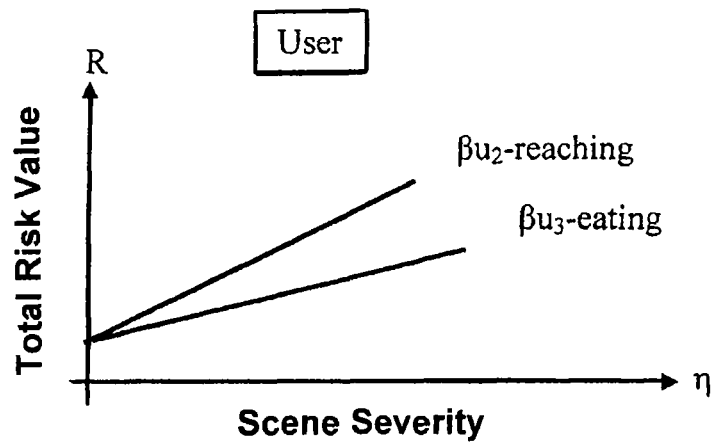
FIG. 19 depicts a graph of a total risk value for a user according to an embodiment of the present invention.

To generate the state trajectory in Step S320, the processor 112 can search the databases in the memory 110 with similar behaviors. For example, as shown in FIG. 19, a user has the behaviors reaching and eating associated with the user, but does not have the activity texting associated with the user. To determine the behavior risk value for texting for the user, another user is found in the database with the texting behavior and other similar behaviors to the user.

Figure 20:
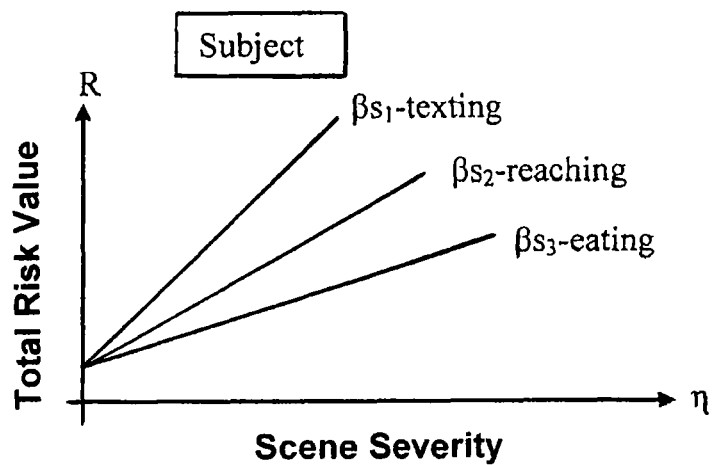
FIG. 20 depicts a graph of a total risk value for a subject according to an embodiment of the present invention.
Figure 21:
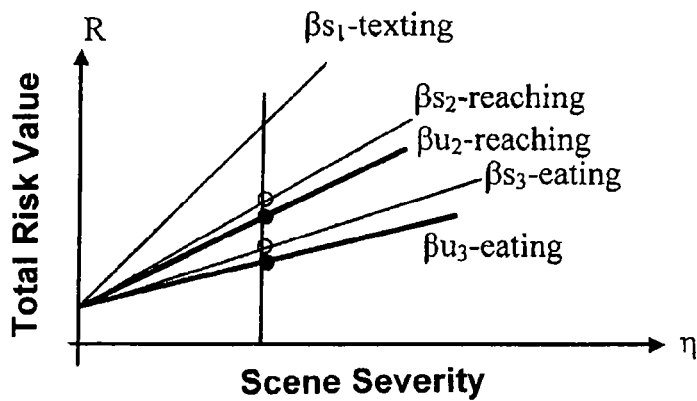
FIG. 21 depicts a superimposition of total risk values for a user and a subject according to an embodiment of the present invention.

Such a user is found in FIG. 20 and is labeled "subject." As can be seen, the subject also has the reaching and eating behavior associated with him. In addition, the subject also has the texting behavior associated with him. Then, as seen in FIG. 21, a comparison is made between the curves $\beta_{s2}$ and $\beta_{u2}$, and between the curves $\beta_{s3}$ and $\beta_{u3}$ at a particular scene severity risk value $\eta$.

Figure 22:
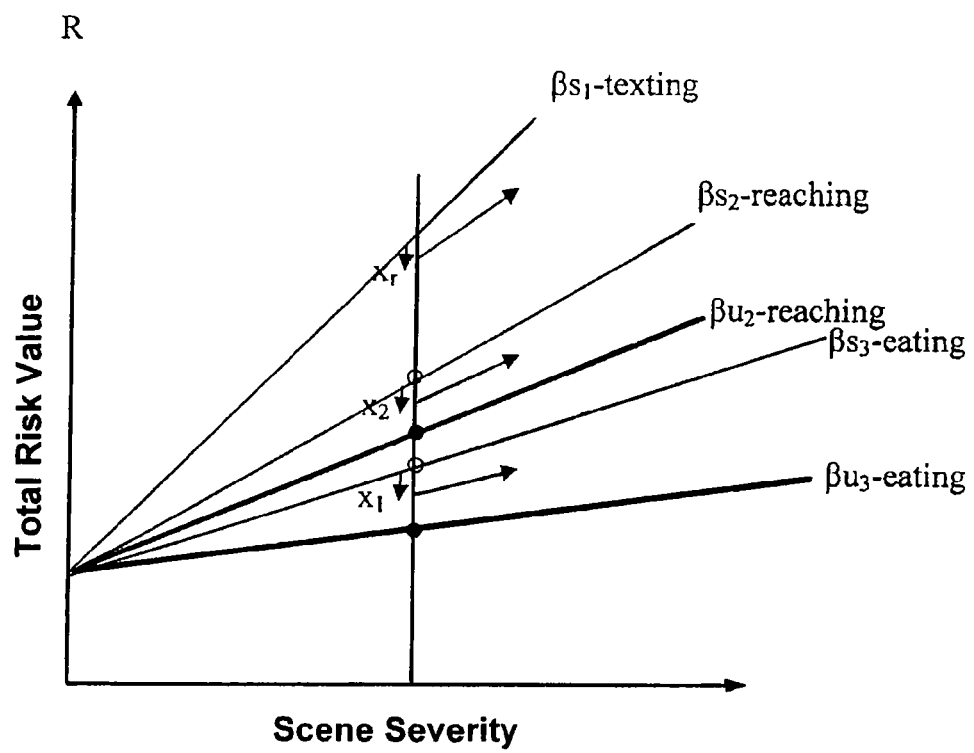
FIG. 22 depicts a graph of a total risk value including offsets according to an embodiment of the present invention.
Figure 23:
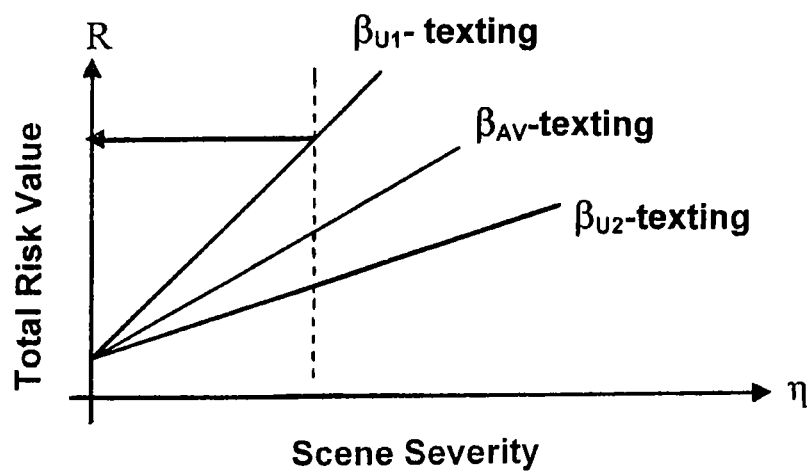
FIG. 23 depicts a graph of a total risk value including an average of behavior risk values according to an embodiment of the present invention.

In FIG. 22, the difference between the curves $\beta_{s2}$ and $\beta_{u2}$ and the curves $\beta_{s3}$ and $\beta_{u3}$ are calculated as offsets $x_2$ and $x_1$. The average of $x_2$ and $x_1$ is calculated as the offset $x_r$ which is applied to the curve $\beta_{s1}$ at a particular scene severity risk value $\eta$ to generate an offset behavior risk value for the particular scene severity risk value $\eta$.

Using the scene severity risk value and the offset behavior risk value, the total risk value R can be calculated in Step S322, which is similar to Step S212 in the flowchart shown in FIG. 17.

Referring back to FIG. 18, if the current behavior is not registered, in Step S324 the new behavior is registered for the current user. In Step S326, the next behavior is retrieved.

If the current user is not registered in Step S312, then in Step S328, a search is performed to match the current behavior with any users in the database. In Step S330, a determination is made as to whether a match is found. If a match is found, then in Step S332, a state trajectory is generated, which is similar to Step S210 in the flowchart shown in FIG. 17. However, unlike Step S320, in Step S332, an average of all of the curves for texting, such as $\beta_{u1}$ and $\beta_{u2}$ are averaged to generate the curve $\beta_{av}$. Using the curve $\beta_{av}$, the average behavior risk value at the scene severity value $\eta$ can be determined. In Step S322, the total risk value R is calculated. For example, the total risk value R is calculated by the processor 112 using the average behavior risk value and the scene severity risk value.

Those of ordinary skill would appreciate that the various illustrative logical blocks, modules, and algorithm steps described in connection with the examples disclosed herein may be implemented as electronic hardware, computer software, or combinations of both. Furthermore, the present invention can also be embodied on a machine readable medium causing a processor or computer to perform or execute certain functions.

To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed apparatus and methods.

The various illustrative logical blocks, units, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the examples disclosed herein may be embodied directly in hardware, in a software module executed by a processor, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a wireless modem. In the alternative, the processor and the storage medium may reside as discrete components in the wireless modem.

The previous description of the disclosed examples is provided to enable any person of ordinary skill in the art to make or use the disclosed methods and apparatus. Various modifications to these examples will be readily apparent to those skilled in the art, and the principles defined herein may be applied to other examples without departing from the spirit or scope of the disclosed method and apparatus. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. A method for risk prediction for a support actuation system having a processor connected to a sensor and to a database, the method comprising:
    detecting, using the sensor, identity data of a first user of an automobile;
    detecting, using the sensor, behavior data of the first user;
    detecting, using the sensor, environment data;
    detecting, using the sensor, event data;
    registering, in the database, the behavior data of the first user in response to the processor determining that the behavior data does not have corresponding behavior data in the database for the first user and does not have corresponding behavior data in the database for other users registered in the database;

generating, using the processor, a state trajectory for the behavior data and a total risk value based on the state trajectory in response to the processor determining that corresponding behavior data is in the database for other users registered in the database but not for the first user; and generating, using the processor, a total risk value based on the identity data, the behavior data, the environment data, the event data, and corresponding behavior data in response to the processor determining that corresponding behavior data is in the database for the first user.

2. The method of claim 1 further comprising performing, using a support actuation module, support actuation in response to the processor determining that the total risk value is greater than a predetermined risk threshold.

3. The method of claim 1 further comprising:
determining, using the processor, an environment risk value associated with the environment data; and
determining, using the processor, an event risk value associated with the event data.

4. The method of claim 3 further comprising analyzing the identity data, using the processor, to locate the first user in the database with an identity corresponding to the identity data.

5. The method of claim 4 further comprising analyzing the behavior data, using the processor, to locate a behavior in the database associated with the first user that corresponds to the behavior data, in response to the processor determining that the first user is located.

6. The method of claim 5 wherein the step of generating the total risk value in response to the processor determining that corresponding behavior data is in the database for the first user includes:
determining, using the processor, a behavior risk value associated with the behavior in the database for the first user that corresponds to the behavior data in response to the processor determining that the behavior in the database associated with the first user that corresponds to the behavior data is located, wherein the generating, using the processor, the total risk value is further based on the behavior risk value, the environment risk value, and the event risk value.

7. The method of claim 5 wherein the step of generating the state trajectory for the behavior data in response to the processor determining that corresponding behavior data is in the database for other users registered in the database but not for the first user includes:
determining, using the processor, a second user with a behavior in the database associated with the second user that corresponds to the behavior data in response to the processor determining that the behavior in the database associated with the first user that corresponds to the behavior data is unable to be located;
analyzing, using the processor, behavior risk values for common behaviors between the first user and the second user to determine an offset; and
applying, using the processor, the offset to a behavior risk value for the behavior in the database associated with the second user that corresponds to the behavior data to determine an offset behavior risk value,
wherein the generating, using the processor, the state trajectory is further based on the offset behavior risk value, the environment risk value, and the event risk value.

8. The method of claim 1 wherein the step of generating the state trajectory for the behavior data in response to the processor determining that corresponding behavior data is in the database for other users registered in the database but not for the first user includes:
analyzing the behavior data, using the processor, to locate behavior in the database associated with any user that corresponds to the behavior data in response to the processor determining that the first user is unable to be located;
determining, using the processor, an environment risk value associated with the environment data; and
determining, using the processor, an event risk value associated with the event data;
determining, using the processor, an average behavior risk value for the behavior in the database associated with any user in the database that corresponds to the behavior data; and
wherein the generating, using the processor, the state trajectory is further based on the average behavior risk value, the environment risk value, and the event risk value.

9. The method of claim 8 further comprising:
storing, using the processor, an entry for a new user in the database with an identity corresponding to the identity data; and
storing, using the processor, an entry for a behavior in the database associated with the new user and corresponding to the behavior data, and having a behavior risk value of the average behavior risk value.

10. A method for risk prediction for a support actuation system in an automobile comprising:
detecting, using a sensor, identity data of a first user of the automobile;
detecting, using the sensor, behavior data of the first user;
detecting, using the sensor, environment data;
detecting, using the sensor, event data;
generating, using a processor, an environment risk value based on the environment data;
generating, using the processor, an event risk value based on the event data;
determining, using the processor, whether the behavior data has corresponding behavior data in a database;
registering, in the database, the behavior data of the first user in response to the processor determining that the behavior data does not have corresponding behavior data in the database for the first user and does not have corresponding behavior data in the database for other users registered in the database;
generating, using the processor, a state trajectory for the behavior data and a total risk value based on the state trajectory in response to the processor determining that corresponding behavior data is in the database for other users registered in the database but not for the first user; and
generating, using the processor, a total risk value based on the identity data, the behavior data, the environment risk value, the event risk value, and corresponding behavior data in response to the processor determining that corresponding behavior data is in the database for the first user.

11. The method of claim 10 further comprising analyzing the identity data, using the processor, to locate the first user in the database with an identity corresponding to the identity data.

12. The method of claim 11 further comprising analyzing the behavior data, using the processor, to locate a behavior in the database associated with the first user that corresponds to the behavior data in response to the processor determining that the first user is located.

13. The method of claim 12 wherein the step of generating the total risk value in response to the processor determining that corresponding behavior data is in the database for the first user includes:
   determining, using the processor, a behavior risk value associated with the behavior in the database for the first user that corresponds to the behavior data in response to the processor determining that the behavior in the database associated with the first user that corresponds to the behavior data is located,
   wherein the generating, using the processor, the total risk value is further based on the behavior risk value, the environment risk value, and the event risk value.

14. The method of claim 10 wherein the step of generating the state trajectory for the behavior data in response to the processor determining that corresponding behavior data is in the database for other users registered in the database but not for the first user includes:
   determining, using the processor, a second user with a behavior in the database associated with the second user that corresponds to the behavior data in response to the processor determining that the behavior in the database associated with the first user that corresponds to the behavior data is unable to be located;
   analyzing, using the processor, behavior risk values for common behaviors between the first user and the second user to determine an offset; and
   applying, using the processor, the offset to a behavior risk value for the behavior in the database associated with the second user that corresponds to the behavior data to determine an offset behavior risk value,
   wherein the generating, using the processor, the state trajectory is further based on the offset behavior risk value, the environment risk value, and the event risk value.

15. The method of claim 11 wherein the step of generating the state trajectory for the behavior data in response to the processor determining that corresponding behavior data is in the database for other users registered in the database but not for the first user includes:
   analyzing the behavior data, using the processor, to locate behavior in the database associated with any user that corresponds to the behavior data in response to the processor determining that the first user is unable to be located;
   determining, using the processor, an average behavior risk value for the behavior in the database associated with any user in the database that corresponds to the behavior data;
   generating, using the processor, the state trajectory by further using the average behavior risk value, the environment risk value, and the event risk value;
   storing, using the processor, an entry for a new user in the database with an identity corresponding to the identity data; and
   storing, using the processor, an entry for a behavior in the database associated with the new user and corresponding to the behavior data, and having a behavior risk value of the average behavior risk value.

16. An automobile comprising:
   a sensor detecting identity data of a first user of the automobile, behavior data of the first user of the automobile, environment data, and event data;
   a memory storing a database, the identity data, the behavior data, the environment data, and the event data;
   a processor connected to the sensor and the memory, and configured to:
   register, in the database, the behavior data of the first user in response to the processor determining that the behavior data does not have corresponding behavior data in the database for the first user and does not have corresponding behavior data in the database for other users registered in the database;
   generate a state trajectory for the behavior data and a total risk value based on the state trajectory in response to the processor determining that corresponding behavior data is in the database for other users registered in the database but not for the first user; and
   generate a total risk value based on the identity data, the behavior data the environment data, and the event data, and corresponding behavior data in response to the processor determining that corresponding behavior data is in the database for the first user.

17. The automobile of claim 16 wherein the processor is further configured to analyze the behavior data to locate a behavior in the database associated with the first user that corresponds to the behavior data in response to the processor determining that the first user is located.

18. The automobile of claim 17 wherein the processor is further configured to:
   determine a behavior risk value associated with the behavior in the database for the first user that corresponds to the behavior data in response to the processor determining that the behavior in the database associated with the first user that corresponds to the behavior data is located, and generate the total risk value by further using the behavior risk value, the environment risk value, and the event risk value.

19. The automobile of claim 16 wherein the processor is further configured to:
   determine a second user with a behavior in the database associated with the second user that corresponds to the behavior data in response to the processor determining that a behavior in the database associated with the first user that corresponds to the behavior data is unable to be located,
   analyze behavior risk values for common behaviors between the first user and the second user to determine an offset,
   apply the offset to a behavior risk value for the behavior in the database associated with the second user that corresponds to the behavior data to determine an offset behavior risk value, and
   generate the state trajectory by further using the offset behavior risk value, the environment risk value, and the event risk value.

20. The automobile of claim 16 wherein the processor is further configured to:
   analyze the behavior data to locate behavior in the database associated with any user that corresponds to the behavior data in response to the processor determining that the first user is unable to be located,
   determine an average behavior risk value for the behavior in the database associated with any user in the database that corresponds to the behavior data,
   generate the state trajectory by further using the average behavior risk value, the environment risk value, and the event risk value,
   store an entry for a new user in the database with an identity corresponding to the identity data, and store an entry for a behavior in the database associated with the new user and corresponding to the behavior data, and having a behavior risk value of the average behavior risk value.

* * * * *